United States Patent [19]

Ryu et al.

[11] Patent Number: 5,513,348
[45] Date of Patent: Apr. 30, 1996

[54] SYSTEM FOR RELATIONAL DATABASE RETRIEVAL THROUGH A LINK FILE BUILT TO ACCESS COMPONENTS OF RELATIONAL TABLES

[75] Inventors: Tadamitsu Ryu; Toshio Takahara, both of Kanagawa; Shingo Hirono, Tokyo; Tohru Matsumoto, Yokohama, all of Japan

[73] Assignee: Fujitsu Limited, Kawasaki, Japan

[21] Appl. No.: 488,859

[22] Filed: Jun. 9, 1995

Related U.S. Application Data

[63] Continuation of Ser. No. 281,540, Jul. 28, 1994, abandoned, which is a continuation of Ser. No. 598,960, Oct. 17, 1990, abandoned.

[30] Foreign Application Priority Data

Oct. 17, 1989 [JP] Japan ................... 1-270047

[51] Int. Cl.⁶ .................................. G06F 17/30
[52] U.S. Cl. ..................... 395/600; 364/DIG. 1; 364/282.1; 364/283.4; 364/283.3
[58] Field of Search ............................ 395/600

[56] References Cited

U.S. PATENT DOCUMENTS

| | | | |
|---|---|---|---|
| 4,128,891 | 12/1978 | Lin et al. | 364/900 |
| 4,221,003 | 9/1980 | Chang et al. | 364/900 |
| 4,631,673 | 12/1986 | Haas et al. | 395/600 |
| 4,918,593 | 4/1990 | Huber | 364/200 |
| 5,129,086 | 7/1992 | Coyle, Jr. et al. | 395/650 |
| 5,133,068 | 7/1992 | Crus et al. | 395/600 |
| 5,206,949 | 4/1993 | Cochran et al. | 395/600 |
| 5,261,080 | 11/1993 | Khoyi et al. | 395/500 |
| 5,369,778 | 11/1994 | Say Soucie et al. | 395/800 |

FOREIGN PATENT DOCUMENTS

| | | | |
|---|---|---|---|
| 0079465 | 5/1983 | European Pat. Off. | G06F 15/40 |
| 0336580 | 10/1989 | European Pat. Off. | G06F 15/40 |
| 0336586 | 11/1989 | European Pat. Off. | |
| 0422643A2 | 4/1991 | European Pat. Off. | |

OTHER PUBLICATIONS

K. Parsaye, M. Chignell, S. Khoshafian, H. Wong, "Intelligent Databases, Object–Oriented, Deductive Hypermedia Technologies" pp. 35–159, No date.

Cardenas, Alfonso F., Data Base Management Systems, Allyn and Bacon, Inc. 1985.

S. Hanata, S. Masui, K. Ohnuma and K. Yamashita, "Conversational Database Query Language", *Review of the Electrical Communication.*

Tore Risch, "Production Program Generation in an Flexible Data Dictionary System", IEEE 1980, pp. 343–349.

*Primary Examiner*—Thomas G. Black
*Assistant Examiner*—Wayne Amsbury
*Attorney, Agent, or Firm*—Staas & Halsey

[57] ABSTRACT

A data retrieval system for a relational database, for retrieving a relational table in a relational database having parts separately identifiable within the system. A link data file stores link data which include parts descriptors that describe command names assigned to parts located at table item positions of the relational table, attribute descriptors which which describe command names of parts arranged in a row of the relational table corresponding to the command names described by the parts descriptors, and mode descriptors which describe command names of parts arranged in a column of the relational table corresponding to the command names described by the parts descriptors. An actual data file is provided for storing actual data related to the command names of the parts which form the relational table. A link process responds to requests for retrieval from the relational table. The link process obtains a command name corresponding to a retrieval request by referring to the link data file and then obtains the actual data described by the command name, from the actual data file.

14 Claims, 12 Drawing Sheets

|   | L01 | L02 | L03 | L04 | - - - - - - - |
|---|---|---|---|---|---|
| A01 | $P_{11}$ | $P_{12}$ | $P_{13}$ | $P_{14}$ | - - - - - - |
| A02 | $P_{21}$ | $P_{22}$ | $P_{23}$ | $P_{24}$ | - - - - - - |
| A03 | $P_{31}$ | $P_{32}$ | $P_{33}$ | $P_{34}$ | - - - - - - |
| A04 | $P_{41}$ | $P_{42}$ | $P_{43}$ | $P_{44}$ | - - - - - - |
| ⋮ | ⋮ | ⋮ | ⋮ | ⋮ | ⋱ |

FIG.10A

| CAR | DISPLACEMENT | LENGTH | WIDTH | HEIGHT | PRICE |
|---|---|---|---|---|---|
| MODEL I | | | | | |
| MODEL II | | | | | |

FIG.10B

| CAR | DISPLACEMENT | PRICE |
|---|---|---|
| MODEL I | 3000 cc | 4.5 MILLION YENS |
| MODEL II | 2000 cc | 3.0 MILLION YENS |

FIG.10C

| CAR | DISPLACEMENT | LENGTH | WIDTH | HEIGHT | PRICE |
|---|---|---|---|---|---|
| MODEL I | 3000 cc | | | | 4.5 MILLION YENS |
| MODEL V | 1600 cc | | | | 1.7 MILLION YENS |
| MODEL II | 2000 cc | | | | 3.0 MILLION YENS |
| MODEL III | 1500 cc | | | | 1.4 MILLION YENS |
| MODEL IV | 2000 cc | | | | 2.5 MILLION YENS |

SYSTEM FOR RELATIONAL DATABASE RETRIEVAL THROUGH A LINK FILE BUILT TO ACCESS COMPONENTS OF RELATIONAL TABLES

This application is a continuation of application Ser. No. 08/281,540, filed Jul. 28, 1994, now abandoned which is a continuation of application Ser. No. 07/598,960, filed Oct. 17, 1990, now abandoned.

BACKGROUND OF THE INVENTION

1. Field of the Invention

The present invention generally relates to data retrieval systems, and more particularly to a data retrieval system for retrieving at high speed a relational table in a relational database divided into parts of which form data.

2. Description of the Related Art

In a terminal such as work station, a data retrieval is made in an interactive mode in which an operator monitors a display screen of the terminal when retrieving a relational table of a relational database. As a result, the relational table is displayed on the display screen. It is desirable that the relational table can be retrieved at a high speed to improve efficiency.

In a conventional relational database, a table managing part which manages table items of the relational table and an item data part which manages specific numerical data for the table items are provided independently. In other words, as shown in FIG. 1, the table managing part is managed in file A, and the item data part is managed in file B which is independent of the file A.

But in the conventional relational database, the numerical data which are managed by the item data part are simply an enumeration of numerical data, and the numerical data have specific meanings only when combined with the table items of the table managing part in a memory as indicated by C in FIG. 1. For this reason, even when retrieving and displaying a portion of the relational table, it is first necessary in the conventional relational database to develop, or create, in the memory all of the table items managed by the table managing part and all of the numerical data managed by the item data part, that is, the entire relational table must be produced, before actually extracting the portion of the relational table which is to be displayed. However, developing the entire relational table in the memory takes time. As a result, the conventional relational database suffers from a problem in that it takes time to retrieve even a portion of the relational table.

SUMMARY OF THE INVENTION

Accordingly, it is a general object of the present invention to provide a novel and useful data retrieving system in which the problem described above is eliminated.

Another and more specific object of the present invention is to provide a data retrieval system for a relational database, for retrieving a relational table which describes the relational database of parts which reference or hold data, comprising a link data file for managing link data, an actual data file for managing actual data, and a link processing part.

The link data include parts sensors or descriptors which describe command names assigned to parts located at table item positions of the relational table, attribute sensors or new descriptors which describe command names of parts arranged in a row of the relational table corresponding with the command names described by the parts sensors, and mode sensors or column descriptors which describe command names of parts arranged in a column of the relational table corresponding with the command names described by the parts sensors. The actual data include the command names of the parts which form the relational table.

The link processing part is coupled to the link data file. The actual data file and this part responds to a retrieval request for retrieval of the relational table, reads a command name description corresponding to a retrieval condition of the retrieval request by referring to the link data file, and obtains the actual data described by the command name description from the actual data file. According to the data retrieval system of the present invention, it is not necessary to develop or create the entire relational table in a memory when retrieving the relational table, and it is thus possible to retrieve the relational table at a high speed especially when retrieving only a portion of the relational table. In addition, since the file data are linked by commands, it is possible to cope with a structural change in the actual data of the file data with a high degree of flexibility.

Other objects and further features of the present invention will be apparent from the following detailed description when read in conjunction with the accompanying drawings.

BRIEF DESCRIPTION OF THE DRAWINGS

FIG. 3 shows an embodiment of a relational table which is described by command names;

FIGS. 10A, 10B and 10C are diagrams for explaining the operation shown in FIG. 9.

DESCRIPTION OF THE PREFERRED EMBODIMENTS

Figure 1:
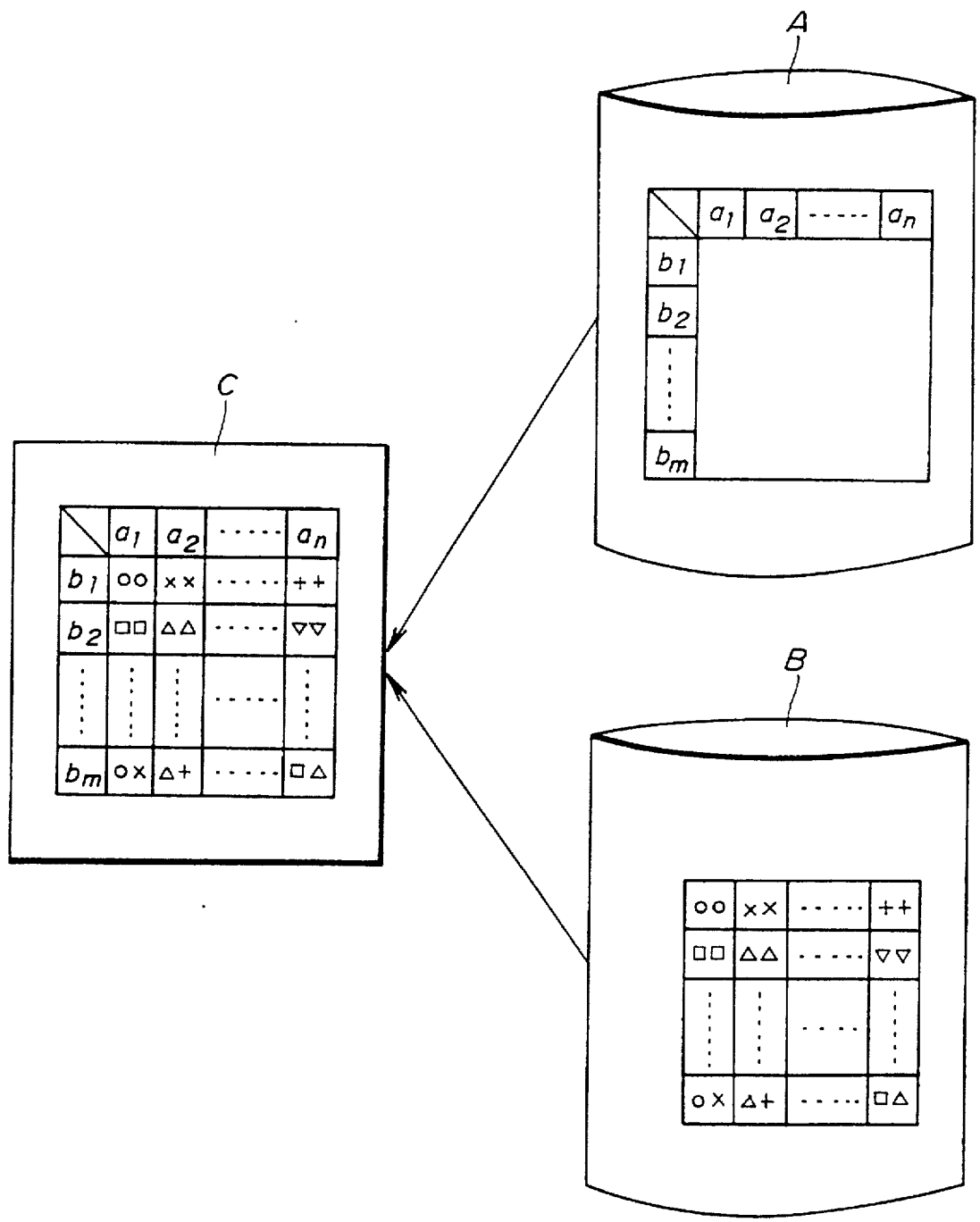
FIG. 1 is a diagram for explaining a conventional relational database.
Figure 2:
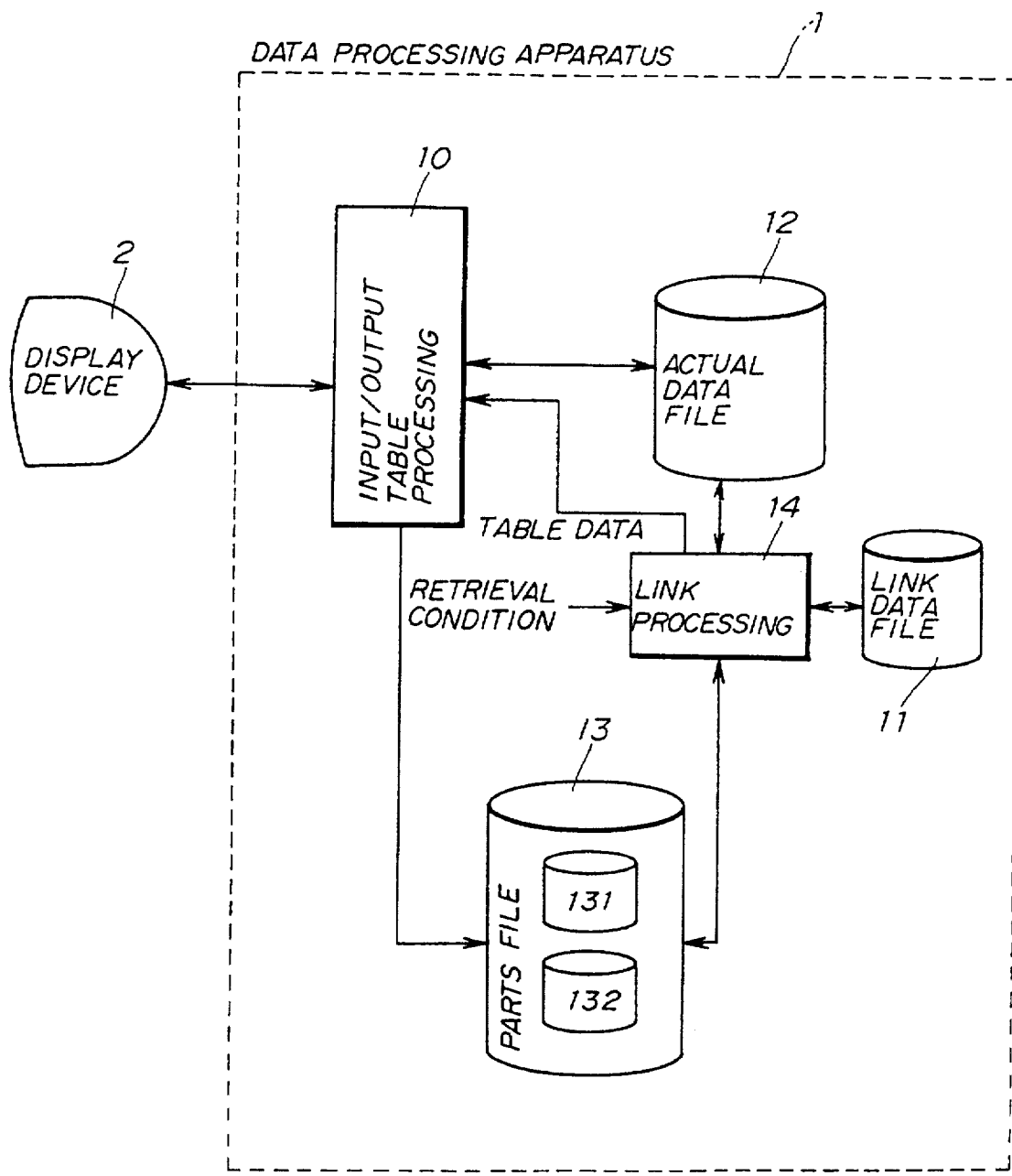
FIG. 2 is a system block diagram for explaining an operating principle of a data retrieval system according to the present invention.

First, a description will be given of an operating principle of a data retrieval system according to the present invention, by referring to FIGS. 2 and 3. FIG. 2 shows a data processing apparatus 1 to which the data retrieval system according to the present invention may be applied together with a display device 2, and FIG. 3 shows an embodiment of a relational table which is described in command names.

The data processing apparatus 1 shown in FIG. 2 includes an input/output table process 10, a link data file 11, an actual data file 12, a parts file 13 and a link process 14 which are coupled as shown.

The input/output table process 10 controls input/output of information between the data processing apparatus 1 and the display device 2. The link data file 11 stores parts sensors, attribute sensors and mode sensors, so as to manage an arrangement of a relational table which is described by command names. The parts sensor item descriptor describes a command name which is assigned to data which is located at a table item position in the relational table of a relational database. The attribute sensor describes a command name which is assigned to a part of the database which is arranged in a row direction of the relational table in correspondence with the command name which is described by the parts sensor column descriptor. The mode sensor describes a command name which is assigned to a part of the database which is arranged in a column direction of the relational table in correspondence with the command name which is described by the parts sensor.

The actual data file 12 manages, or stores, actual data of the parts forming the relational table using the command names as keys. The parts file 13 manages, or stores, soft sensors 131 and link sensors 132. The soft sensor are descriptors for 131 attribute information such as the name, keyword and command name of the separately identifiable parts of the database which are stored in the actual data file 12. On the other hand, the link sensors 132 are descriptors of attribute information such as the name, keyword and command name of the parts sensors, the attribute sensors and the mode sensors which are stored in the link data file 11.

The link process 14 refers to the link data file 11 when there is a request to retrieve a relational table, and retrieves a command name description corresponding to a retrieval condition. In addition, the link process 14 obtains actual data which is indicated by a command name description from the actual data file 12, and displays the obtained actual data on the display device 2.

According to the present invention, the relational table which describes the relational database is described by the command names which are assigned to each of the parts of the database. In addition, the description of the relational table is managed by, i.e., stored in the link data file 11, while the actual data of each command name is managed by or stored in the actual data file 12. The term "part" will be used to refer to file data which is described as a part, i.e., related data in the database, and the term "command name" which is assigned to the part describes the attribute information of the part. FIG. 3 shows an embodiment of the relational table which is described by the command names.

The link data file 11 manages the relational table according to the parts sensors, the attribute sensors and the mode sensors. Hence, in the case of the relational table shown in FIG. 3, the parts sensors, the attribute sensors and the mode sensors may be represented as follows.

"Parts Sensors"
$\equiv PX1$
$\equiv X1, A01, A02, \ldots, L01, L02, \ldots$

"Attribute Sensors"
$\equiv ZA01$
$\equiv A01, X1, L01, P_{11}, L02, P_{12}, \ldots$
$ZA02$
$\equiv A02, X1, L01, P_{21}, L02, P_{22}, \ldots$ "Mode Sensors"
$\equiv ML01$
$\equiv L01, X1, A01, P_{11}, A02, P_{21}, \ldots$
$ML02$
$\equiv L02, X1, A01, P_{12}, A02, P_{22}, \ldots$ In the case of the relational table shown in FIG. 3, the actual data file 12 manages the actual data of the command names X1, A01, A02, A03, . . . , L01, L02, L03, . . . , $P_{11}$, $P_{12}$, $P_{13}$, . . . .

On the other hand, the link sensors 132 of the parts file 13 in this case manage the command name PX1 of the parts sensor, the command names ZA01, ZA02, ZA03, . . . of the attribute sensors, and the command names ML01, ML02, ML03, . . . of the mode sensors in correspondence with names which are easily understood by the operator.

For example, when the operator specifies the name of the link sensor 132 of the relational table and makes the retrieval request from the display device 2, the link processing part 14 refers to the link sensor 132 of the parts file 13 and specifies the command name which is described in the retrieval condition of the retrieval request. If the retrieval condition is a logical sum of the name which corresponds to the command name ZA01 and the name which corresponds to the command name ZA02 and the retrieval request for the relational table is made with this retrieval condition, the link processing part 14 refers to the link sensor 132 of the parts file 13 and specifies that the retrieval condition relates to a logical sum of the command names ZA01 and ZA02.

Next, the link processing part 14 refers to the link data of the link data file 11 so as to obtain the command name description corresponding to the retrieval condition. In the above described case, the link processing part 14 obtains that the retrieval condition of the retrieval request relates to a logical sum of ZA01≡A01, X1, L01, $P_{11}$, L02, $P_{12}$, . . . and ZA02≡A02, X1, L01, $P_{21}$, L02, $P_{22}$, . . . .

When the command name description which corresponds to the retrieval condition is obtained, the link processing part 14 obtains the actual data described by the command name description which is derived in accordance with the actual data file 12, and displays the actual data on the display device 2. In the above described case, the data portion related to the command names ZA01 and ZA02 of the relational table is displayed on the display device 2.

According to the present invention, unlike the conventional data retrieval system, it is not necessary to develop the entire relational table in a memory when retrieving only a portion of the relational table. For this reason, it is possible to retrieve the relational table at an extremely high speed, especially when retrieving a portion of the relational table.

Figure 4:
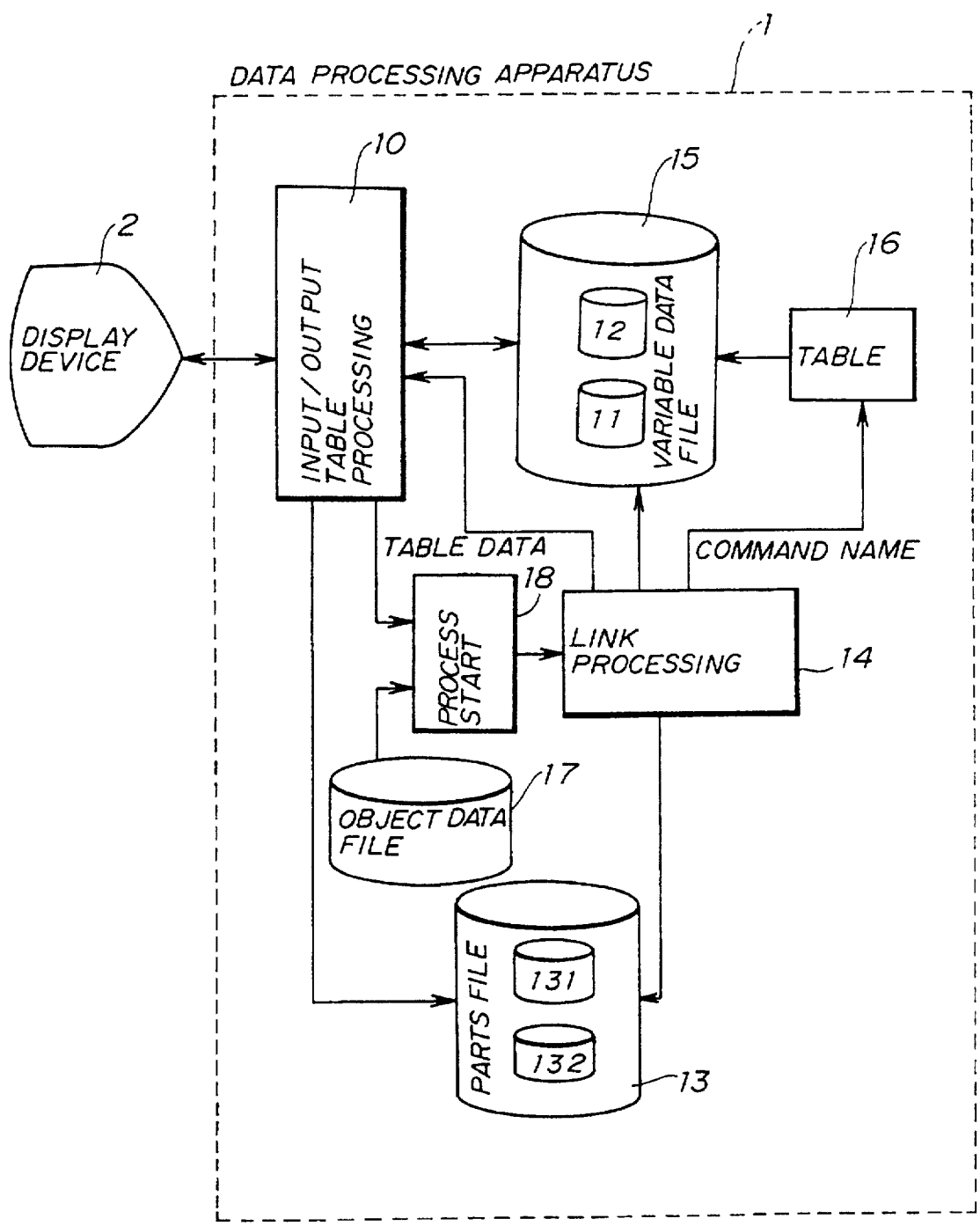
FIG. 4 is a system block diagram showing an embodiment of the data retrieval system according to the present invention.

Next, a description will be given of an embodiment of the data retrieval system according to the present invention, by referring to FIG. 4. In FIG. 4, those parts which are the same as those corresponding parts in FIG. 2 are designated by the same reference numerals, and a description thereof will be omitted.

In FIG. 4, a variable data file 15 includes the link data file 11 and the actual data file 12 shown in FIG. 2. This variable data file 15 manages the corresponding relationship between the command names which are managed by the parts file 13 and storage addresses (storage locations) of these command names in the variable data file 15. An object data file 17 manages program addresses of application programs, for example, and manages a program which processes the retrieval request for the relational table of the relational database. A process start part 18 starts the link processing part 14 when the retrieval request for the relational table of the relational database is made from the display device 2 or when the retrieval request for the relational table of the relational database is made from the program specified by the object data file 17.

Figure 5:
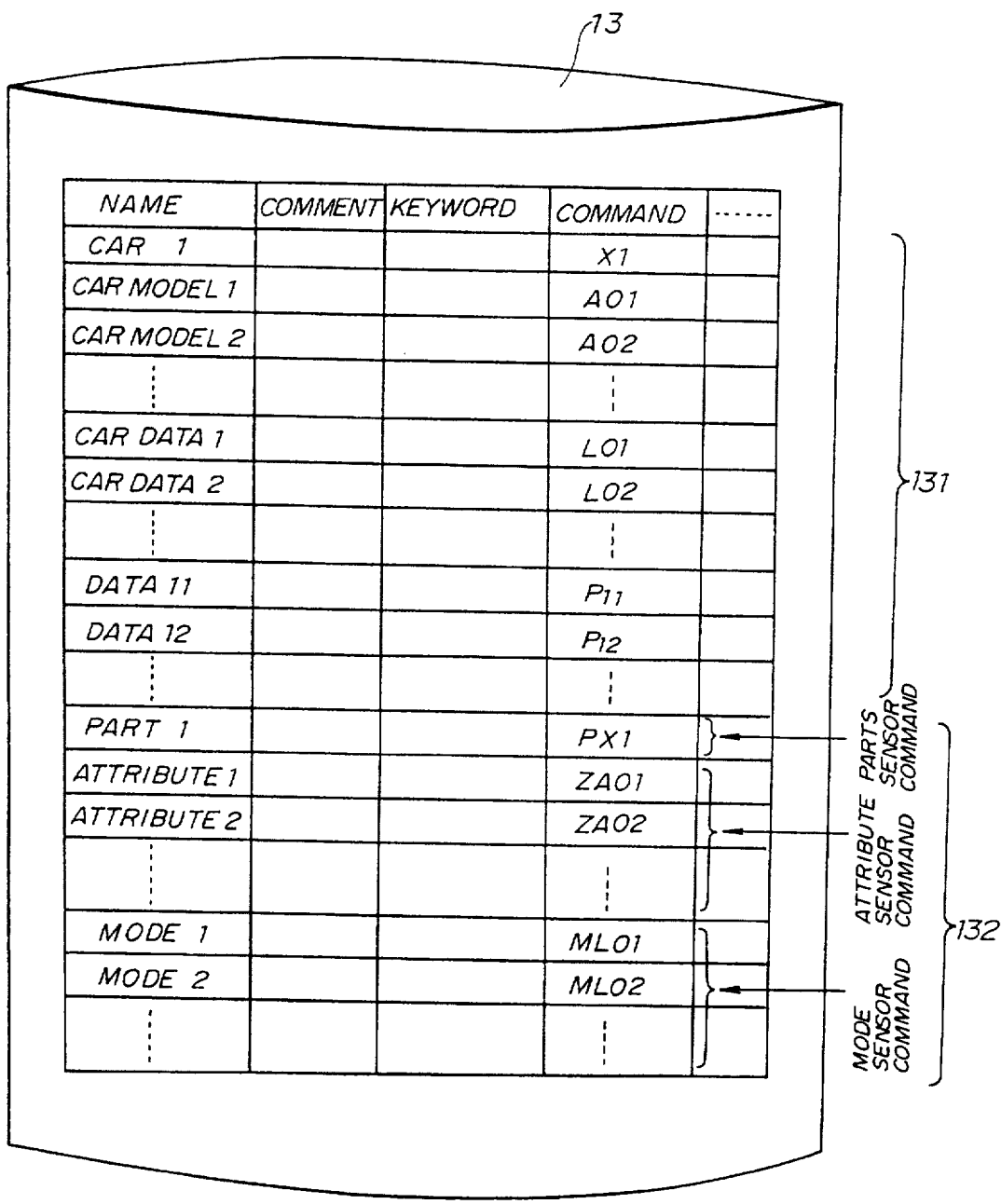
FIG. 5 shows an embodiment of management data of a parts file.

FIG. 5 shows an embodiment of the management data of the parts file 13. FIG. 5 shows the management data of the parts file 13 assuming that the relational table shown in FIG. 3 is to be processed. As shown in FIG. 5, the soft sensors (descriptors) 131 of the parts file 13 manage attribute information of the parts which are stored in the actual data file 12 of the variable data file 15. That is, the attribute information such as the name, keyword and command name of the parts forming the relational table of the relational database. On the other hand, the link sensors descriptors 132 of the parts file 13 manage the attribute information such as the name, keyword and command name of the parts sensors, attribute sensors and mode sensors which are stored in the link data file 11 of the variable data file 15. The process of registering the management data of the parts file 13 is carried out via the input/output table processing part 10 depending on a registration instruction from the operator using a menu, for example. The attribute information such as the processes of the data of the parts is assigned by the command names of the parts file 13.

Figure 6:
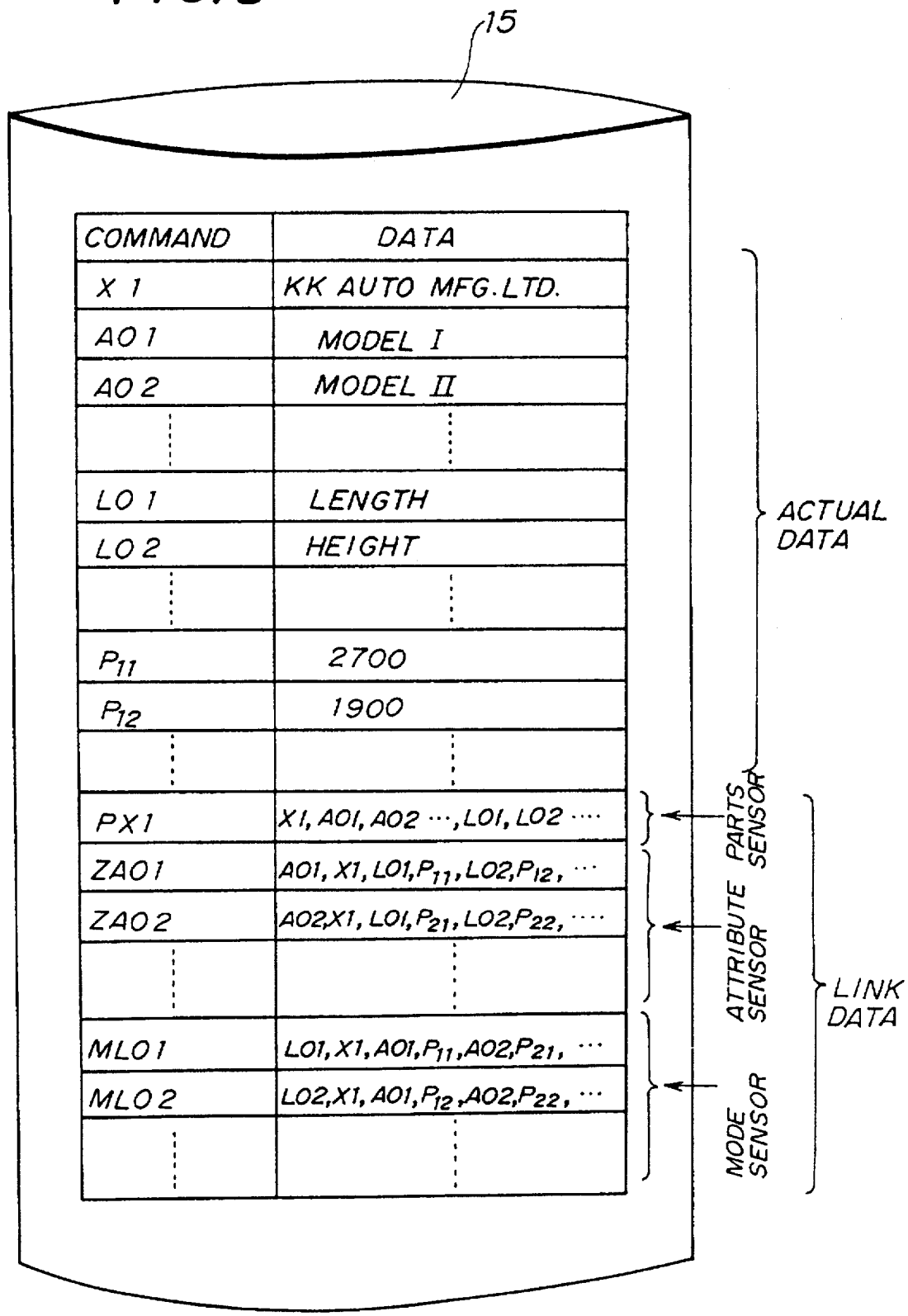
FIG. 6 shows an embodiment of management data of a variable data file.

FIG. 6 shows an embodiment of the management data of the variable data file 15 which is stored in correspondence with the management data of the parts file 13 shown in FIG. 5. Actually, a table 16 manages the corresponding relationships of the command names and the storage addresses. However, in order to facilitate the understanding of the management data of the variable data file 15, the variable data of the variable data file 15 is shown in FIG. 6 using the command names as the key. As shown, the variable data file 15 manages the actual data corresponding to each of the command names of the soft sensors 131 in the parts file 13. In addition, the variable data file 15 manages the parts sensor $PX1 \equiv X1, A01, A02, \ldots, L01, L02, \ldots$ which corresponds to the parts sensor command PX1 of the link sensor 131 in the parts file 13, the attribute sensors $ZA01 \equiv A01, X1, L01, P_{11}, L02, P_{12}, \ldots, ZA02 \equiv A02, X1, L01, P_{21}, L02, P_{22}, \ldots, \ldots$ which correspond to the attribute sensor commands ZA01, ZA02, ..., and the mode sensors $ML01 \equiv L01, X1, A01, P_{11}, A02, P_{21}, \ldots, ML02 \equiv L02, X1, A01, P_{12}, A02, P_{22}, \ldots, \ldots$ which correspond to the mode sensor commands ML01, ML02, .... The process of registering the management data of the variable data file 15 is carried out via the input/output table process 10 depending on a registration instruction from the operator using a menu, for example.

Figure 7:
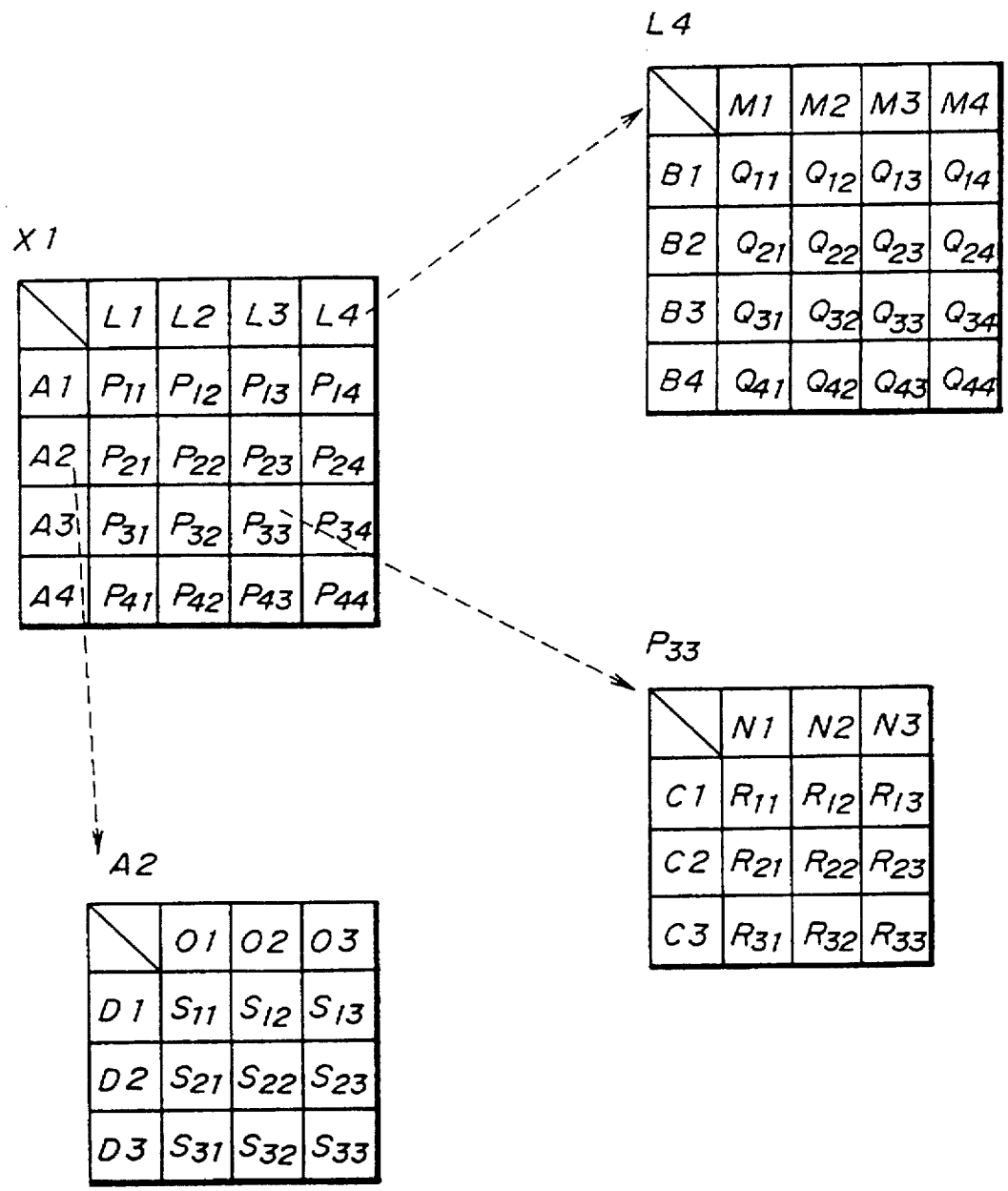
FIG. 7 is a diagram for explaining a structure of a relational table.

The relational database may have a hierarchical structure, so that the commands forming the relational table may have similar relational tables as shown in FIG. 7. In other words, the commands may be developed in a lower layer relational table which is described by the commands, and the commands in the lower layer relational table may further be developed in a still lower layer relational table. The relational tables in the lower layers are also managed by the parts file 13 and the variable data file 15, similarly to the main relational table of the uppermost layer.

Next, a description will be given of an operation of the link process 14, by referring to a flow chart shown in FIG. 8.

Figure 8:
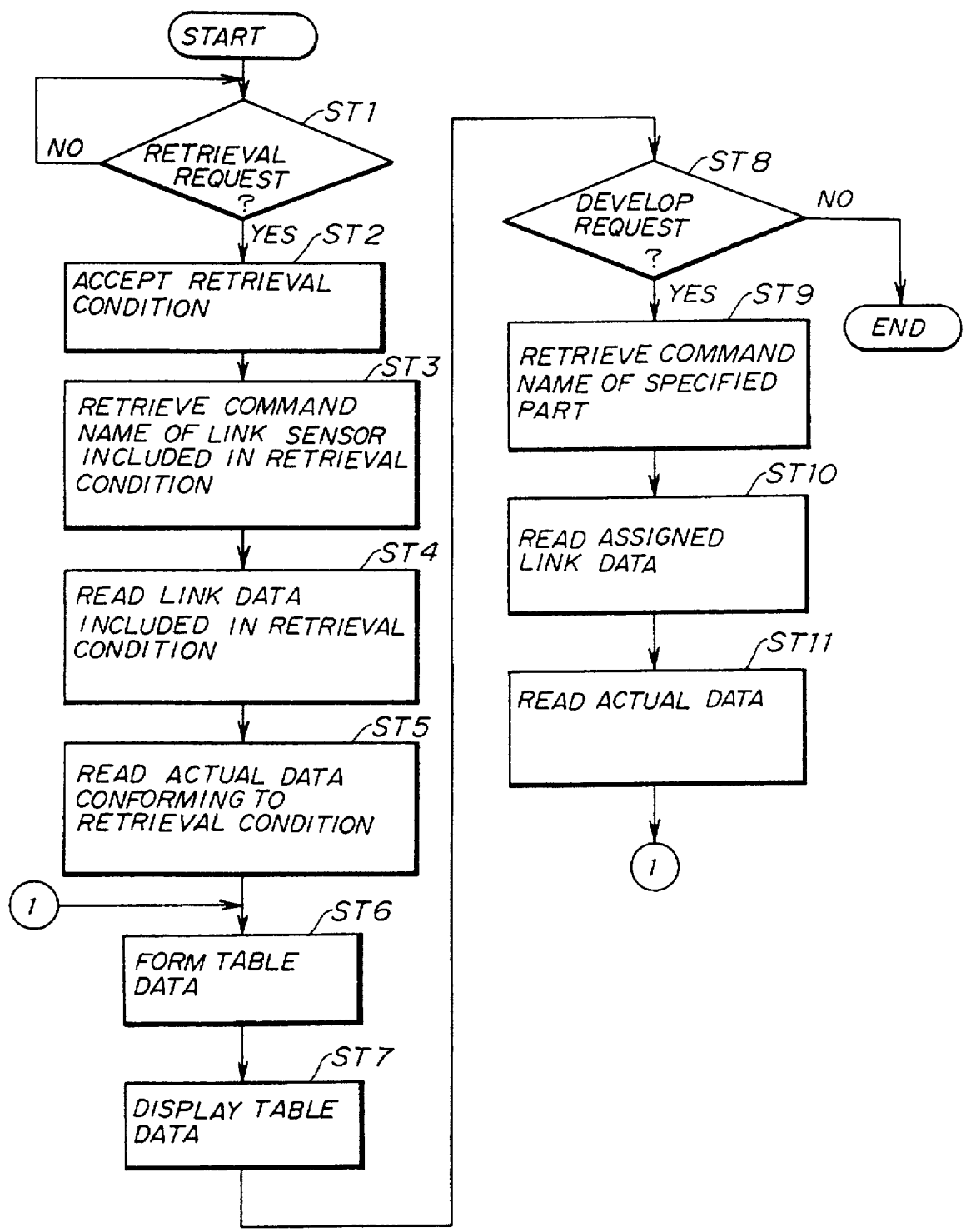
FIG. 8 is a flow chart for explaining an operation of a link processing part of the embodiment of the data retrieval system shown in FIG. 4.

In FIG. 8, the step ST1 determines whether or not there is a retrieval request for a relational table from the process start part 18. When the result of the step ST1 is YES, the step ST2 accepts a retrieval condition which is specified by the operator or by the program which is specified by the object data file 17. For example, the retrieval condition is specified by specifying the names of the parts of the relational table, such as outputting the entire relational table, outputting only the first row described by the name "attribute 1" in FIG. 5, outputting only the second column described by the name "mode 2" in FIG. 5, and outputting a logical sum of the third and fifth rows.

The method of specifying the names of the parts is not limited to the above described method in which the names of the parts of the link sensors 132 are specified. For example, the names of the parts may be specified by specifying the names of the parts of the soft sensors 131. On the other hand, the retrieval condition which is requested by the program specified by the object data file 17 is specified directly by the command name.

When the retrieval condition is accepted, the step ST3 refers to the parts file 13 and retrieves the command name of the link sensor 132 included in the retrieval condition. For example, when the retrieval condition relates to a logical sum of the "attribute 1" and the "attribute 2" shown in FIG. 5, that is, when the retrieval condition relates to a logical sum of the first and second rows of the relational table, the command names ZA01 and ZA02 are retrieved by the step ST3. When the retrieval condition is requested by the program specified by the object data file 17, the command names ZA01 and ZA02 are specified immediately.

The step ST4 refers to the variable data file 16 via the table 16, and reads the link data which corresponds to the command name of the link sensor 132 retrieved in the step ST3. In step ST4, the link processing part 14 reads the link data $ZA01 \equiv A01, X1, L01, P_{11}, L02, P_{12}, \ldots$ which corresponds to the attribute sensor having the command name ZA01 and the link data $ZA02 \equiv A02, X1, L01, P_{21}, L02, P_{22}, \ldots$ which corresponds to the attribute sensor having the command name ZA02 in the above described case. Furthermore, the step ST4 derives the command name description corresponding to the retrieval condition. In other words, in the above described case, the step ST4 obtains the command name description related to the retrieval condition which is the logical sum of $ZA01 \equiv A01, X1, L01, P_{11}, L02, P_{12}, \ldots$ and $ZA02 \equiv A02, X1, L01, P_{21}, L02, P_{22}, \ldots$.

After the command name description of the retrieval condition is derived, the step ST5 refers to the variable data file 15 via the table 16 and reads the actual data conforming to the retrieval condition by retrieving the actual data having the command name included in the command name description. Then, the step ST6 forms table data from the retrieval result based on the actual data, and the step ST7 displays the table data on the display device 2 so as to display the relational table which is requested by the retrieval request.

While the table data of the retrieval result is displayed on the display device 2, the step ST8 determines whether or not there exists a develop (table) request to develop (create) the commands in the lower layer relational table described in conjunction with FIG. 7. The process ends when the judgement result in the step ST8 is NO.

On the other hand, when the result in step ST8 is YES, the step ST9 refers to the parts file 13 and retrieves the command names of the parts which are to be obtained. Then, the step ST10 refers to the variable data file 15 and reads the link data of the assigned lower layer relational table. In addition, the step ST11 reads corresponding actual data from the variable data file 15 depending on the link data which is read in the step ST10. Thereafter, the process returns to the step ST6, so that the lower layer relational table which is requested by the develop request is displayed. In FIG. 8, the link processing part 14 displays the entire lower layer relational table. However, it is of course possible to display only the required portion of the lower layer relational table, similarly to the display of only a portion of the main relational table in the uppermost layer.

In the embodiment described above, the data processing apparatus 1 may be made up of a central processing unit (CPU) and memory units. In this case, the CPU carries out the functions of the input/output table process 10, the link process 14 and the process start part or process 18 shown in FIG. 4. The memory units are used for the files 13, 15 and 17 and the table 16.

It is of course possible to provide to the commands which are assigned to the parts as procedures so as to object-orient the parts. Furthermore, the commands may have symbolic labels.

Next, a description will be given of an operation of the link process 14 when obtaining a logical sum or logical product of the contents of the relational table, by referring to a flow chart shown in FIG. 9.

Figure 9A:
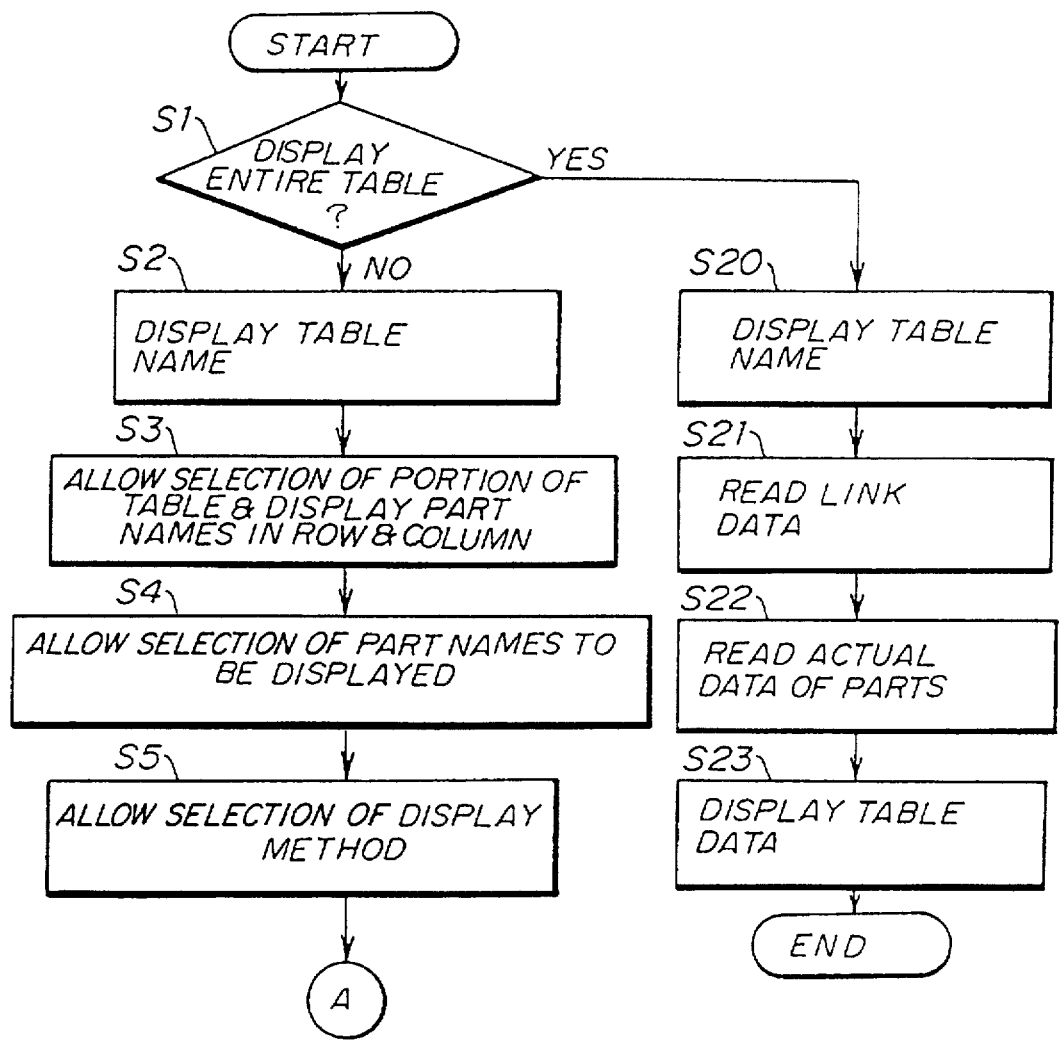
FIGS. 9A and 9B are a flow chart for explaining an operation of the link processing part when obtaining a logical sum or logical product of contents of a relational table.
Figure 9B:
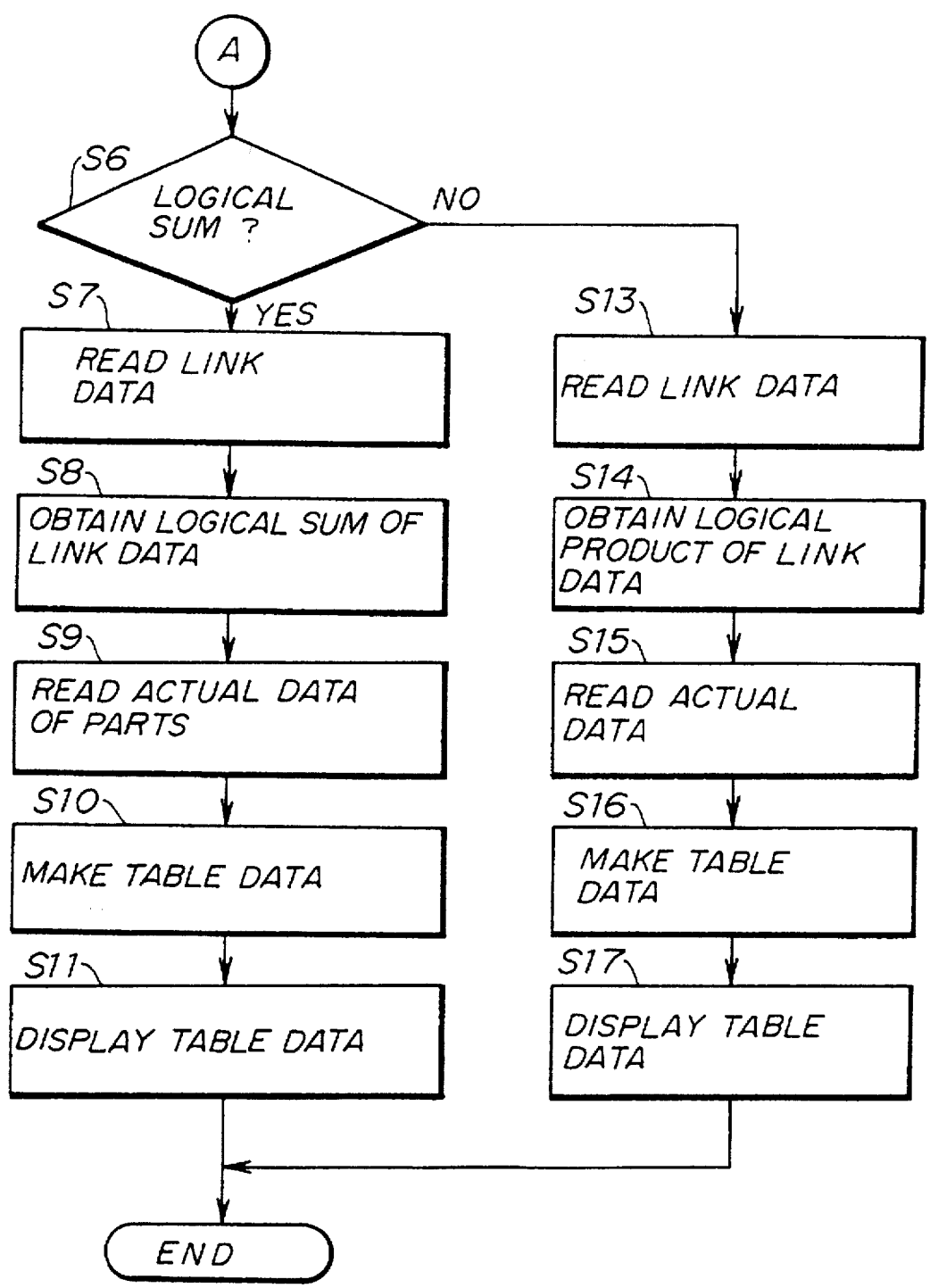

In FIG. 9, the step S1 determines whether or not the entire relational table is to be displayed on the display device 2. When the result in step S1 is NO, the step S2 displays the table name from the parts file 13. Step S3 obtains the operator's selection of a portion of the table such as "Car" and displays the part names in the row and column of the selected table portion. Step S4 obtains the selection of the part names which are to be displayed, such as "Model I", "Model II", "Displacement" and "Price" which will be described later. Step S5 obtains the selection of the display method, and step S6 determines whether or not a logical sum is to be displayed.

When the result of step S6 is YES, step S7 reads the link data based on the part names. Then, step S8 obtains a logical sum of the link data. Step S9 reads the actual data of the parts from the logical sum, and step S10 makes the table data. Step S11 displays the table data and the process ends. In this case, the information shown in FIG. 10A is displayed, for example.

On the other hand, when the result of step S6 is NO, step S13 reads the link data based on the part names. Then, step S14 obtains a logical product of the link data. Step S15 reads the actual data of the parts from the logical product, and step S16 makes the table data. Step S17 displays the table data and the process ends. In this case, the information shown in FIG. 10B is displayed, for example.

When the result of step S1 is YES, step S20 displays the part names based on the parts file 13, and step S21 reads the link data based on the table (part) names. Step S22 reads the actual data of the parts based on the link data, and step S23 makes and displays the table data. In this case, the information shown in FIG. 10C is displayed, for example.

Next, a description will be given of an operation of the link processing part 14 when modifying the contents of the relational table, by referring to a flow chart shown in FIG. 11.

Figure 11:
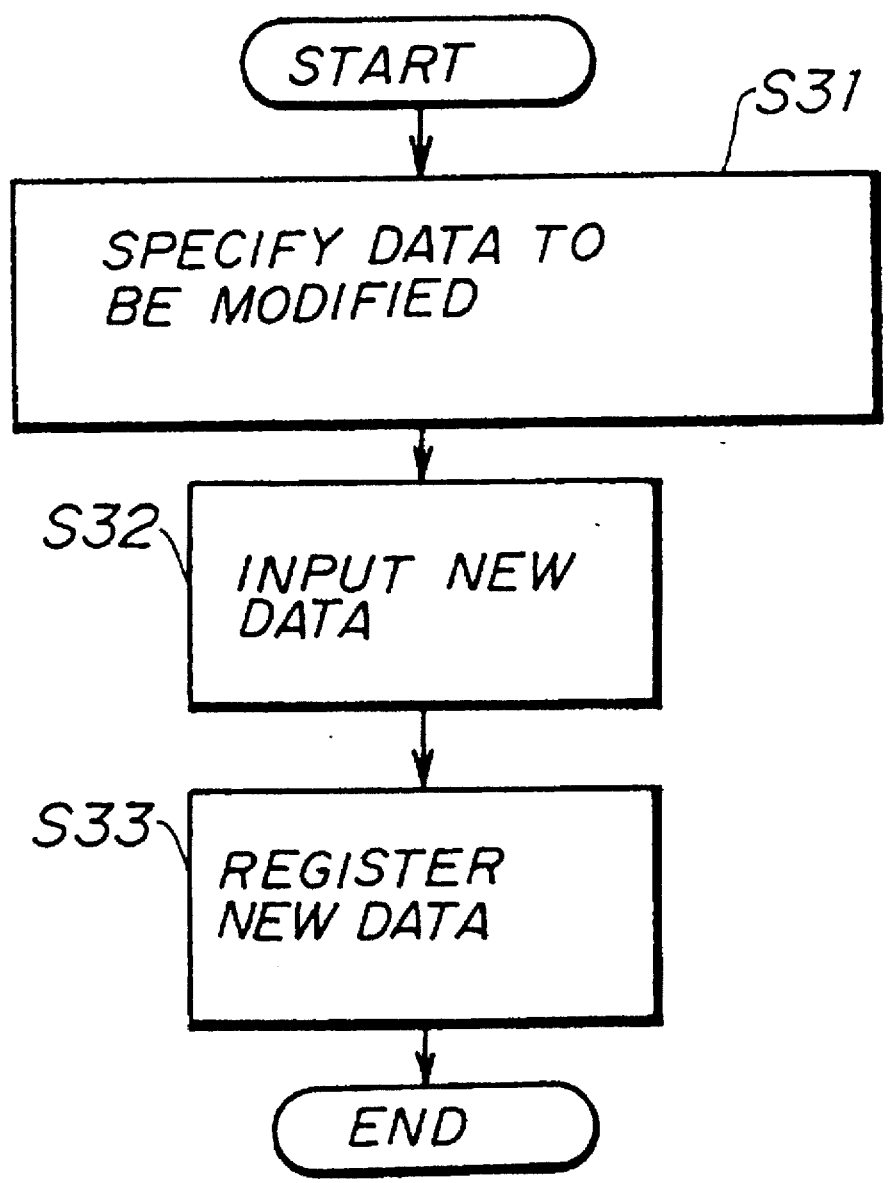
FIG. 11 is a flow chart for explaining an operation of modifying contents of the relational table.

In FIG. 11, step S31 specifies one or a plurality of parts the data of which are to be modified. A mouse, cursor or the like of the display device 2 may be used to specify the parts of the relational table which is displayed on the display device 2. Then, step S32 inputs new data for the specified parts from a keyboard which forms a terminal together with the display device 2, for example. Step S33 makes access to the actual data file 12 of the variable data file 15 and registers the new data therein, and the process ends.

Further, the present invention is not limited to these embodiments, but various variations and modifications may be made without departing from the scope of the present invention.

What is claimed is:

1. A data retrieval system for a relational database, for retrieving a relational table in the relational database of parts which form data, said data retrieval system comprising:

a link data file managing link data including parts sensors which describe command names assigned to parts located at table item positions of the relational table, attribute sensors which describe command names of parts arranged in a row direction of the relational table corresponding to the command names described by said parts sensors, and mode sensors which describe command names of parts arranged in a column direction of the relational table corresponding to the command names described by said parts sensors;

an actual data file for managing actual data, of the parts corresponding to the command names, which form the relational table; and link processing means for linking said link data file and said actual data file, responsive to a retrieval request which requests retrieval of the relational table, for reading a command name description corresponding to a retrieval condition of the retrieval request by referring to said link data file, and for obtaining the actual data described by said command name description from said actual data file.

2. The data retrieval system as claimed in claim 1, further comprising a parts file, coupled to said link processing means, managing first attribute information of the parts managed by said actual data file and second attribute information of the parts sensors, the attribute sensors and the mode sensors using predetermined names respectively assigned to the first and second attribute information, said first attribute information including at least the command names managed by said actual data file, said second attribute information including at least the command names managed by said link data file.

3. The data retrieval receives system as claimed in claim 2, wherein said link processing means receives the retrieval request via said parts file.

4. The data retrieval system as claimed in claim 2, which further comprises a table, coupled to said link processing means, managing corresponding relationships of the command names and storage addresses of the command names in said link data file and said actual data file.

5. The data retrieval system as claimed in claim 1, further comprising an object data file, coupled to said link processing means, managing program addresses of application programs.

6. The data retrieval system as claimed in claim 5, wherein said retrieval request is made by a program specified by said object data file.

7. The data retrieval system as claimed in claim 1, wherein said link processing part includes means for modifying arbitrary data in the relational table by modifying command names in said link data file and/or said actual data file.

8. The data retrieval system as claimed in claim 1, wherein the retrieval condition of said retrieval request requests retrieval of only a portion of the relational table.

9. The data retrieval system as claimed in claim 8, wherein the retrieval condition of said retrieval request specifies one of a logical sum and a logical product of command names.

10. The data retrieval system as claimed in claim 1, which further comprises display means, coupled to said link processing means, for displaying the actual data described by said command name description.

11. A data retrieval system for retrieving requested data in a relational database having data referenced by parts including item parts referencing actual data and table parts referencing rows and columns of the item parts, said data retrieval system comprising:

an actual data storage storing actual data corresponding to command names;

a link data storage operatively connected to said actual data storage and storing link data including:
table descriptors describing command names of table parts;
row descriptors describing command names of parts in a same row in the relational database as the table parts described by the table descriptors; and
column descriptors describing command names of parts in a same column in the relational database as the table parts described by the table descriptors; and link processing means for receiving a request for the requested data, accessing said link data storage to obtain the link data corresponding to the requested data, and accessing said actual data storage to obtain the actual data corresponding to the command names in the link data obtained from the link data storage.

12. A data retrieval system as claimed in claim 11, further comprising:

request means for requesting the requested data as a portion of a relational table in the relational database; and display means for displaying the actual data obtained by said link processing means as the portion of the table requested by said request means.

13. A method of retrieving requested data in a relational database having data referenced by parts including item parts referencing actual data and table parts referencing rows and columns of the item parts, comprising the steps of:

(a) storing actual data corresponding to command names in an actual data storage;

(b) storing link data in a link data storage, the link data including:
table descriptors, describing command names of table parts;
row descriptors describing command names of parts in a same row in the relational database as the table parts described by the table descriptors; and
column descriptors describing command names of parts in a same column in the relational database as the table parts described by the table descriptors;

(c) reading the link data corresponding to the requested data from the link data storage; and (d) reading the actual data corresponding to the command names in the link data read from the link storage, from the actual data storage.

14. A method as claimed in claim 13, additionally comprising step (e) of displaying the actual data obtained responsive to the requested data.

* * * * *

UNITED STATES PATENT AND TRADEMARK OFFICE
CERTIFICATE OF CORRECTION

PATENT NO. : 5,513,348
DATED : April 30, 1996
INVENTOR(S) : Ryu et al.

It is certified that error appears in the above-indentified patent and that said Letters Patent is hereby corrected as shown below:

On the cover page: Item [75]

line 1, "Ryu;" should be --Ryu, Yokohama;--;

line 2, "both of Kanagawa;" should be --Kawasaki;--.

Col. 3, line 25, "sensor" should be --sensors--;

line 46, "in" should be --in,--.

Col. 7, line 15, "to" (second occurrence) should be deleted.

Signed and Sealed this

Tenth Day of December, 1996

Attest:

BRUCE LEHMAN

*Attesting Officer*     *Commissioner of Patents and Trademarks*